US009564742B2

(12) United States Patent
Nakashima

(10) Patent No.: US 9,564,742 B2
(45) Date of Patent: Feb. 7, 2017

(54) ELECTRICITY CONNECTION BOX

(71) Applicant: Yazaki Corporation, Tokyo (JP)

(72) Inventor: Akinori Nakashima, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/731,618

(22) Filed: Jun. 5, 2015

(65) Prior Publication Data
US 2015/0357799 A1 Dec. 10, 2015

(30) Foreign Application Priority Data

Jun. 6, 2014 (JP) ................................. 2014-117917

(51) Int. Cl.
*H02B 1/20* (2006.01)
*H02B 1/48* (2006.01)
*B60R 16/023* (2006.01)

(52) U.S. Cl.
CPC ........... *H02B 1/202* (2013.01); *B60R 16/0238* (2013.01); *H02B 1/48* (2013.01)

(58) Field of Classification Search
CPC ..... B60R 16/0238; H01R 12/00; H01R 13/68; H01R 2201/20; H02G 3/08; H02G 3/12; H02G 3/16; H02G 3/18; H02B 1/32; H02B 1/48; H02B 1/202
USPC ........ 361/600, 601, 622, 641–643, 657–659, 361/679.01, 730, 732, 757; 174/50, 58, 174/59, 70 R, 135, 254, 489, 520; 439/76.2, 83, 92, 157, 439/652, 521, 367, 439/686, 604, 949
See application file for complete search history.

(56) References Cited

U.S. PATENT DOCUMENTS

| | | | | |
|---|---|---|---|---|
| 2,107,865 A | * | 2/1938 | Jackson | H02G 3/00 174/51 |
| 2,360,304 A | * | 10/1944 | McLoughlin | H01R 4/489 174/59 |
| 5,764,487 A | * | 6/1998 | Natsume | B60R 16/0238 174/72 B |
| 5,785,532 A | * | 7/1998 | Maue | B60R 16/0238 439/34 |
| 5,817,976 A | * | 10/1998 | Yanase | H01H 85/2035 174/559 |
| 5,995,380 A | * | 11/1999 | Maue | B60R 16/0238 174/254 |
| 6,108,202 A | * | 8/2000 | Sumida | B60R 16/0238 361/690 |

(Continued)

FOREIGN PATENT DOCUMENTS

| | | | | |
|---|---|---|---|---|
| JP | 02006280038 A | * | 10/2006 | ............... H02G 3/12 |
| JP | 2013-198347 A | | 9/2013 | |

*Primary Examiner* — Robert J Hoffberg
(74) *Attorney, Agent, or Firm* — Sughrue Mion, PLLC

(57) ABSTRACT

An electricity connection box includes a housing which includes a first insertion port and a second insertion port, a first connection portion group made of connection portions which are provided inside the housing and to which electric wires of a first electric wire group are connected, and a second connection portion group made of connection portions which are provided inside the housing and to which electric wires of a second electric wire group are connected. The first electric wire group is inserted through the first insertion port, and the second electric wire group is inserted through the second insertion port. The first connection portion group is closer to the first insertion port than the second connection portion group. The second connection portion group is closer to the second insertion port than the first connection portion group.

3 Claims, 5 Drawing Sheets

(56) References Cited

U.S. PATENT DOCUMENTS

| | | | | |
|---|---|---|---|---|
| 6,368,118 B1* | 4/2002 | Sakamoto | B60R 16/0238 | 439/688 |
| 6,462,270 B1* | 10/2002 | Depp | H02G 3/088 | 174/50 |
| 6,494,722 B1* | 12/2002 | Sakamoto | B60R 16/0207 | 439/404 |
| 6,577,025 B2* | 6/2003 | Hentschel | B60R 16/0207 | 307/10.1 |
| 7,422,443 B2* | 9/2008 | Kaneko | H05K 7/026 | 439/76.2 |
| 7,586,038 B2* | 9/2009 | Kanamaru | H02G 3/083 | 174/489 |
| 7,670,184 B2* | 3/2010 | Akahori | B60R 16/0238 | 439/620.27 |
| 7,767,905 B2* | 8/2010 | Meyer | H02G 3/086 | 174/135 |
| 7,934,934 B2* | 5/2011 | Taniguchi | H02G 3/083 | 439/76.1 |
| 8,348,679 B2* | 1/2013 | Lee | B60R 16/0238 | 439/76.2 |
| 8,425,238 B2* | 4/2013 | Takeuchi | H02G 3/088 | 439/76.2 |
| 8,927,858 B2* | 1/2015 | Sato | B60R 16/0238 | 174/50 |
| 9,084,349 B2* | 7/2015 | Maebashi | H05K 5/0047 | |
| 9,162,636 B2* | 10/2015 | Nakayama | B60R 16/0238 | |
| 9,444,183 B2* | 9/2016 | Degen | H01R 13/627 | |
| 2006/0089021 A1* | 4/2006 | Kanamaru | B60R 16/0215 | 439/76.2 |
| 2007/0249189 A1* | 10/2007 | Kaneko | H05K 7/026 | 439/76.2 |
| 2009/0009978 A1* | 1/2009 | Fujimaki | H05K 7/026 | 361/752 |
| 2009/0221160 A1* | 9/2009 | Taniguchi | H02G 3/083 | 439/76.2 |
| 2009/0314541 A1* | 12/2009 | Jones | H02G 3/185 | 174/559 |
| 2010/0136805 A1* | 6/2010 | Maebashi | B60R 16/0238 | 439/76.2 |
| 2013/0250489 A1 | 9/2013 | Toda et al. | | |
| 2014/0022046 A1* | 1/2014 | Saimoto | H01H 85/2035 | 337/188 |
| 2014/0127917 A1* | 5/2014 | Makino | B60R 16/0238 | 439/76.2 |

* cited by examiner

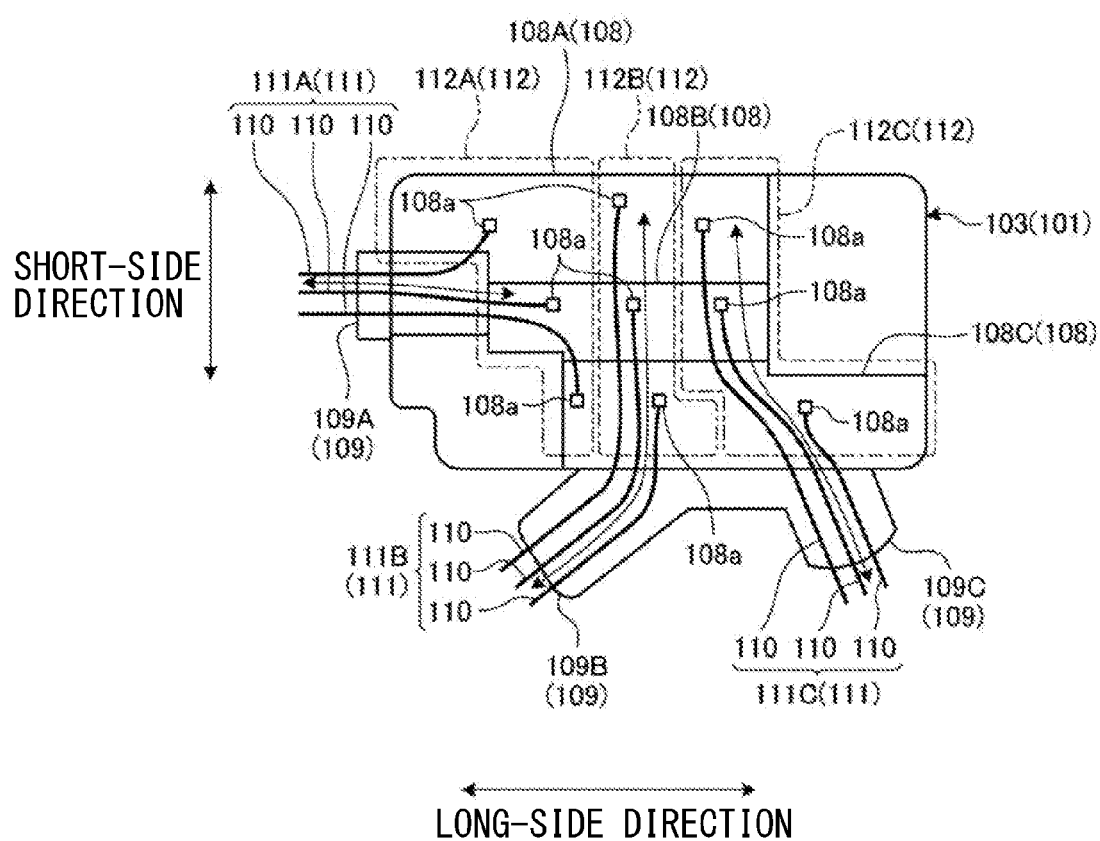

ELECTRICITY CONNECTION BOX

BACKGROUND

The present invention relates to an electricity connection box.

As an electricity connection box in the related art, for example, an electricity connection box which is mounted on a vehicle or the like, and houses various electronic component modules is disclosed in Patent Document 1.

[Patent Document 1] JP-A-2013-198347

SUMMARY

However, the electricity connection box described in the above-described Patent Document 1 has room for further improvement in reducing the size thereof.

In consideration of the above-described situation, an object of the present invention is to provide an electricity connection box which can be reduced in size.

In order to achieve the above-described object, there is provided an electricity connection box, comprising:

a housing which accommodates an electronic component therein, and includes a first insertion port and a second insertion port;

a first connection portion group made of a plurality of connection portions which are provided inside the housing and to which terminal parts of a plurality of electric wires of a first electric wire group are connected; and a second connection portion group made of a plurality of connection portions which are provided inside the housing and to which terminal parts of a plurality of electric wires of a second electric wire group are connected, wherein the electric wires of the first electric wire group are inserted through the first insertion port, and the electric wires of the second electric wire group are inserted through the second insertion port, wherein the first connection portion group is positioned to be closer to the first insertion port than the second connection portion group, and wherein the second connection portion group is positioned to be closer to the second insertion port than the first connection portion group.

The electricity connection box may further comprise a plurality of blocks which are provided inside the housing, each of the blocks being formed with a part of the connection portions of the first connection portion group and a part of the connection portions of the second connection portion group. The first insertion port and the second insertion port may be disposed at a certain interval with respect to a predetermined direction of the housing, the plurality of blocks may extend along the predetermined direction, and may be adjacent to each other along a direction that intersects with the predetermined direction. The first connection portion group may be positioned to be closer to the first insertion port than the second connection portion group in each of the plurality of blocks. The second connection portion group may be positioned to be closer to the second insertion port than the first connection portion group in each of the plurality of blocks.

The housing may include a third insertion port and a third connection portion group. The third insertion port may be disposed at a certain interval with respect to the predetermined direction from the first insertion port and the second insertion port. The third connection portion group may be made of a plurality of connection portions which are provided inside the housing and to which terminal parts of a plurality of electric wires of a third electric wire group are connected. The electric wires of the third electric wire group may be inserted through the third insertion port. The third connection portion group may be positioned to be closer to the third insertion port than the first connection portion group and the second connection portion group in each of the plurality of blocks.

BRIEF DESCRIPTION OF DRAWINGS

FIG. 5 is a schematic view illustrating zoning of connection portion groups in the electricity connection box according to the embodiment.

DETAILED DESCRIPTION OF EXEMPLIFIED EMBODIMENTS

Hereinafter, an embodiment according to the present invention will be described in detail based on the drawings. In addition, the invention is not limited to the embodiment. In addition, regarding constituent elements in the following embodiment, elements which can be easily replaced by those skilled in the art, or substantially the same elements are included.

Figure 1:
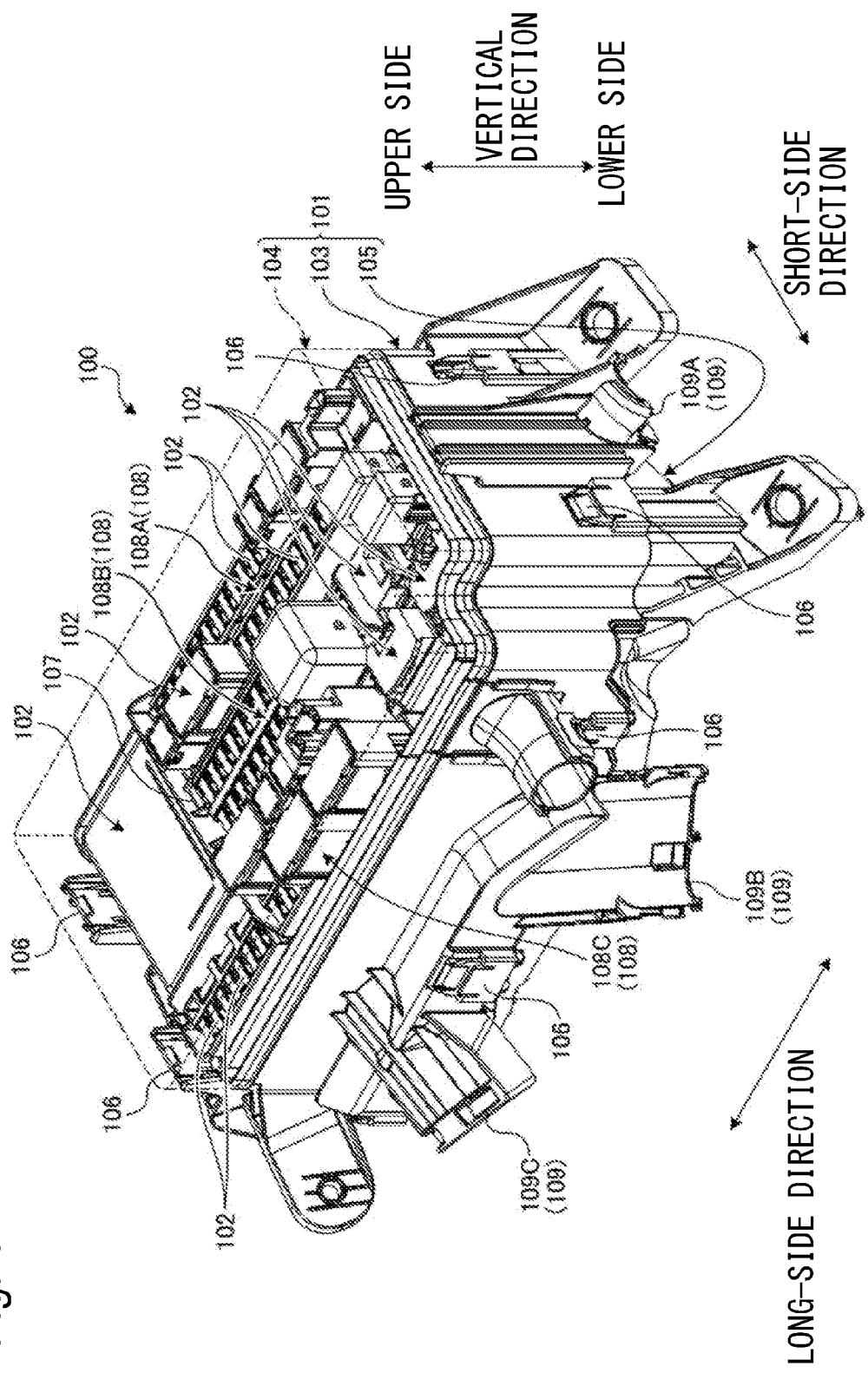
FIG. 1 is a perspective view illustrating a schematic configuration of an electricity connection box according to an embodiment.
Figure 2:
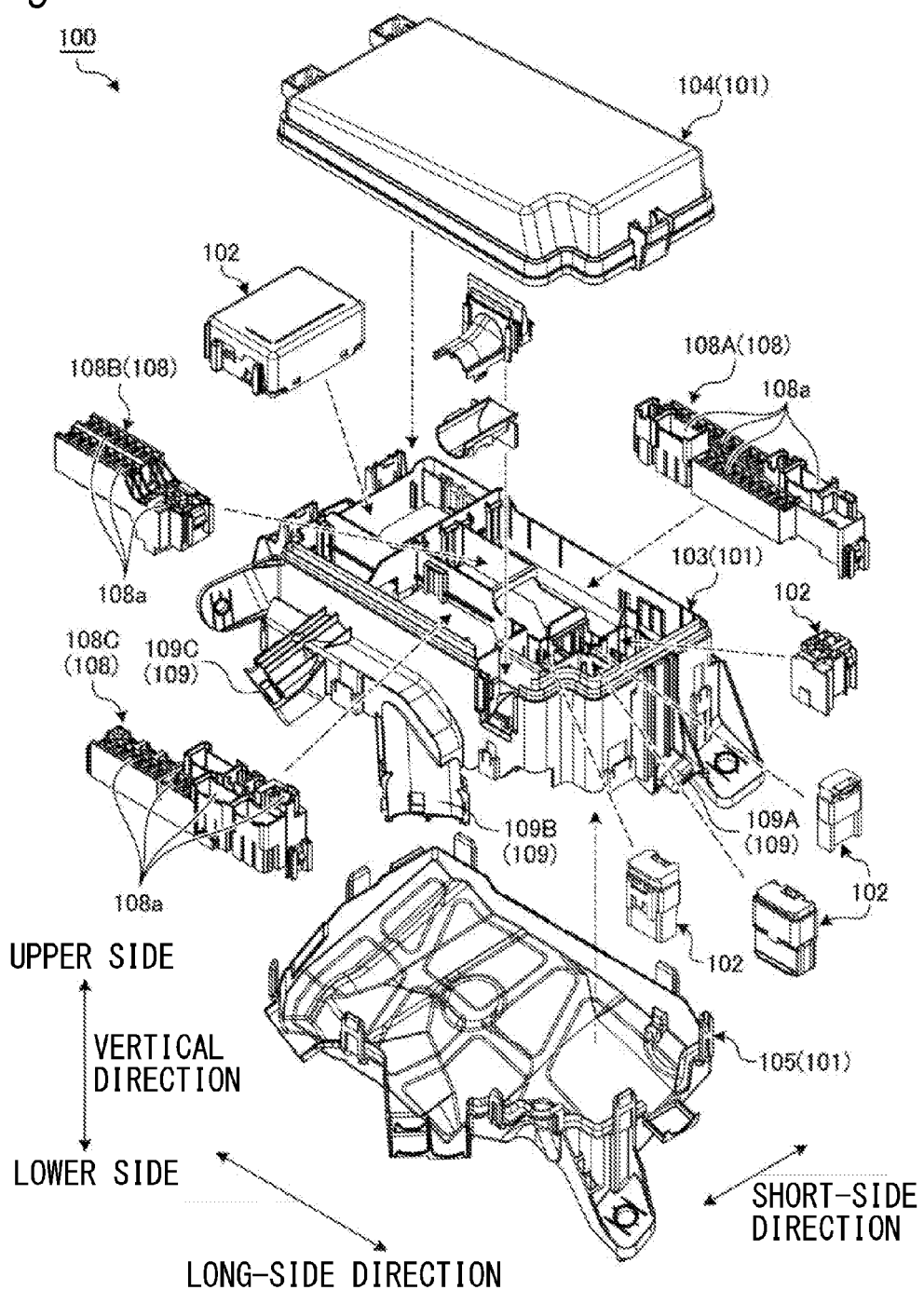
FIG. 2 is an exploded perspective view illustrating a schematic configuration of the electricity connection box according to the embodiment.
Figure 3:
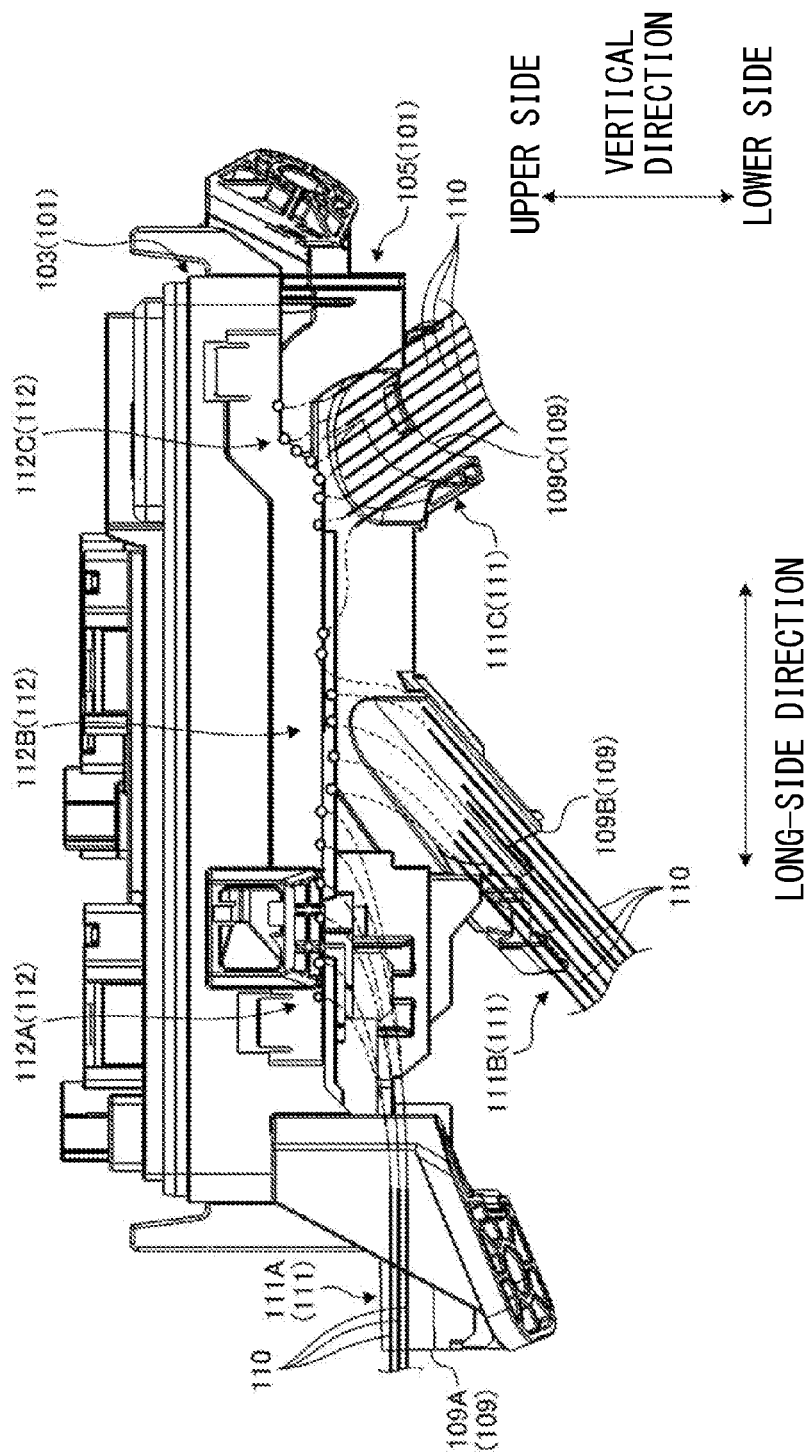
FIG. 3 is a side view of a frame and a lower cover of the electricity connection box according to the embodiment.
Figure 4:
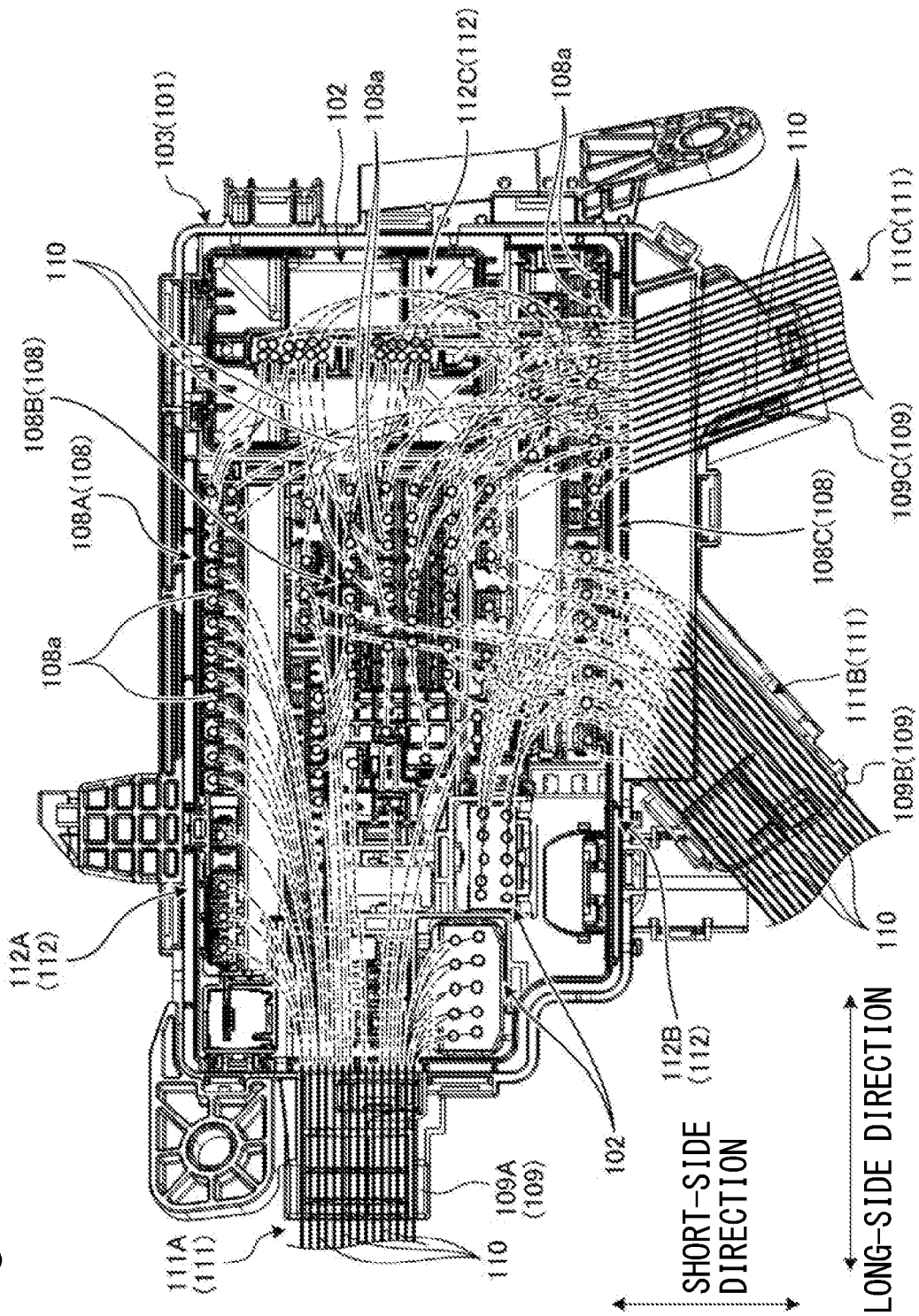
FIG. 4 is a rear view of the frame of the electricity connection box according to the embodiment.

FIG. 1 is a perspective view illustrating a schematic configuration of an electricity connection box according to an embodiment. FIG. 2 is an exploded perspective view illustrating a schematic configuration of the electricity connection box according to the embodiment. FIG. 3 is a side view of a frame and a lower cover of the electricity connection box according to the embodiment. FIG. 4 is a rear view of the frame of the electricity connection box according to the embodiment. FIG. 5 is a schematic view illustrating zoning of connection portion groups in the electricity connection box according to the embodiment. In addition, FIG. 1 illustrates an upper cover of the electricity connection box by using a two-dot chain line. In addition, FIG. 4 illustrates a surface on a side where the lower cover is provided in the frame. Furthermore, in FIGS. 3 and 4, the electric wires are schematically illustrated, and terminals which constitute terminal parts of the electric wires are schematically illustrated by using "o". FIG. 5 is a schematic view illustrating the surface on the side where the lower cover is provided in the frame, and a block diagram illustrating a positional relationship or the like of the electric wire groups, connection portion groups, and the plurality of blocks.

An electricity connection box 100 according to the embodiment illustrated in FIGS. 1 and 2 is mounted on a vehicle, such as an automobile, and aggregates and houses electrical components, such as a connector that constitutes a connection processing component, such as a wire harness or an electric wire, a fuse, a relay, a branching portion, or an electronic control unit, therein. The electricity connection box 100 is installed, for example, in an engine compartment of the vehicle or at a lower part of a vehicle body, and is connected between a power source, such as a battery, and various electronic devices which are mounted in the vehicle. The electricity connection box 100 distributes electric power supplied from the power source to various electronic devices in the vehicle. In addition, there is a case where the electricity connection box 100 is called a junction box, a fuse box, or a relay box, but the electric connection box is a general term for these in the embodiment.

The electricity connection box 100 houses various electronic components 102 in a housing space portion inside a housing 101. For example, the housing 101 is configured of a frame 103, an upper cover 104, a lower cover 105 and the like. The housing 101 has a three-layer separated structure in which the frame 103, the upper cover 104, and the lower cover 105 are separated from each other. The frame 103, the upper cover 104, and the lower cover 105 are formed of an insulating synthetic resin. The frame 103 is a member which mainly forms the housing space portion in which the electronic components 102 are assembled. The frame 103 is formed in a tubular shape substantially having the shape of a square, and in a state where the electricity connection box 100 is connected to the engine compartment or the like, an opening is positioned on an upper side of a vertical direction and on a lower side in the vertical direction. The upper cover 104 is a member having the shape of a lid that blocks the opening on the upper side in the vertical direction of the frame 103. The lower cover 105 is a member having the shape of a tray that blocks the opening on the lower side in the vertical direction of the frame 103. In the housing 101, the opening on the upper side in the vertical direction of the frame 103 and the opening of the upper cover 104 oppose each other, the opening on the lower side in the vertical direction of the frame 103 and the opening of the lower cover 105 oppose each other, the upper cover 104 is assembled on the upper side in the vertical direction of the frame 103, and the lower cover 105 is assembled on the lower side in the vertical direction of the frame 103. In the housing 101, the upper cover 104 and the lower cover 105 are locked via a locking mechanism 106 having a various types of shapes onto the frame 103. In addition, a direction in which the frame 103, the upper cover 104, and the lower cover 105 are layered is typically along the vertical direction in a state where the electricity connection box 100 is connected to the engine compartment or the like, but there is a case where the direction of the layering is set to have a predetermined angle with respect to the vertical direction according to an installation state of the electricity connection box 100.

In addition, examples of the various electronic components 102 which are assembled in the housing space portion inside the housing 101 include a connector, a fuse, a relay, a branching portion, an electronic control unit, or the electronic component unit, as described above. In the electricity connection box 100, the various electronic components 102 are assembled in cavities 108a (refer to FIG. 2 or the like) which serve as multiple connection portions that are formed by partition walls 107 having various shapes formed to be integrated with the frame 103, and blocks 108 having various shapes assembled to be attachable to and detachable from the frame 103. In this case, the partition wall 107 and the blocks 108 are also formed of an insulating synthetic resin, similarly to the frame 103 or the like. In addition, in the electricity connection box 100, terminals or the like of electric wires 110 (refer to FIGS. 3 to 5 or the like) which are routed via an insertion port 109 are fitted from the lower side in the vertical direction and electrically connected to the cavities 108a to which various electronic components 102 are assembled.

The electricity connection box 100 of the embodiment includes the plurality of blocks 108. Specifically, the electricity connection box 100 includes at least a first block 108A, a second block 108B, and a third block 108C, as the block 108. The first block 108A, the second block 108B, and the third block 108C are respectively provided inside the housing 101, and the plurality of cavities 108a are formed. The first block 108A, the second block 108B, and the third block 108C are disposed to extend along a predetermined direction and to be adjacent to each other along a direction which intersects with the predetermined direction. Here, for example, the predetermined direction is a long-side direction of the housing 101, and the first block 108A, the second block 108B, and the third block 108C are disposed to extend along the long-side direction of the housing 101 and to be adjacent to each other along a short-side direction which intersects with the long-side direction. In the electricity connection box 100 of the embodiment, the first block 108A and the third block 108C are respectively disposed to be close to a wall of the frame 103 inside the housing 101, and the second block 108B is disposed between the first block 108A and the third block 108C. In the first block 108A, the second block 108B, and the third block 108C, the fuse, the unit, and the connector that serve as the electronic components 102 are plugged and fitted from the upper side in the vertical direction with respect to each cavity 108a, and the terminals or the like that constitute the terminal parts of the electric wires 110 (refer to FIGS. 3 to 5 or the like) are plugged and fitted from the lower side in the vertical direction. Accordingly, each electronic component 102 and the electric wires 110 are electrically connected to each other.

Here, in the electricity connection box 100, for example, a plurality of different power supply systems are configured of the first block 108A, the second block 108B, and the third block 108C. The first block 108A constitutes a first power supply system, and for example, distributes electricity which is directly supplied from the battery to each portion. The second block 108B constitutes a second power supply system which is different from the first power supply system, and for example, distributes electricity to each portion on a downstream side of the first power supply system and a third power supply system which will be described later. The third block 108C constitutes the third power supply system which is different from the first power supply system and the second power supply system, and for example, distributes electricity which is directly supplied from an alternator that generates electricity with power generated by an engine to each portion. In addition, the electricity connection box 100 may be configured to include the electric wire 110 (refer to FIG. 4 or the like) or the like which links each block 108 to each other or the electronic components 102 to each other.

Furthermore, the housing 101 of the embodiment includes a plurality of insertion ports 109. Specifically, as illustrated in FIGS. 3 to 5 or the like, the housing 101 includes at least a first insertion port 109A, a second insertion port 109B, and a third insertion port 109C, as the insertion port 109, and a plurality of electric wire groups 111 are led out to the outside from the housing 101 via the insertion ports. A first electric wire group 111A which is made of a plurality of electric wires 110 is inserted through the first insertion port 109A as the electric wire group 111. A second electric wire group 111B which is made of a plurality of electric wires 110 and is different from the first electric wire group 111A is inserted through the second insertion port 109B as the electric wire group 111. A third electric wire group 111C which is made of a plurality of electric wires 110 and is different from the first electric wire group 111A and the second electric wire group 111B is inserted through the third insertion port 109C as the electric wire group 111. The first insertion port 109A, the second insertion port 109B, and the third insertion port 109C are disposed at a certain interval with respect to the predetermined direction. Here, as described above, the predetermined direction is, for example, the long-side direction of the housing 101, and the first insertion port 109A, the second insertion port 109B, and the third insertion port 109C are disposed at a certain interval with respect to the long-side direction of the housing 101. The first insertion port 109A of the embodiment is formed on a side surface on a short side of the housing 101, and the second insertion port 109B and the third insertion port 109C are formed on a side surface which is the same side as the side surface on a long side of the housing 101. In the housing 101, the first insertion port 109A, the second insertion port 109B, and the third insertion port 109C are disposed at a certain interval in order from one side with respect to the long-side direction. The first electric wire group 111A which is led out via the first insertion port 109A from the inside of the housing 101 is routed, for example, to a front side of the vehicle. The second electric wire group 111B which is led out via the second insertion port 109B from the inside of the housing 101 is routed, for example, to an interior side of the vehicle. The third electric wire group 111C which is led out via the third insertion port 109C from the inside of the housing 101 is routed, for example, to a rear side of the vehicle.

In addition, in the above-described plurality of blocks 108, the plurality of insertion ports 109, and the plurality of electric wire groups 111, a relationship between "first", "second", and "third" is set for the sake of convenience and is not limited to the description above.

In addition, as illustrated in FIGS. 3 to 5, in the electricity connection box 100 of the embodiment, the plurality of cavities 108a which are formed in each block 108 constitute a plurality of connection portion groups 112, and as the plurality of connection portion groups 112 are zoned in accordance with a leading-out direction of the electric wires 110 via the insertion port 109, a low height and a small size of the apparatus are achieved. In other words, in the electricity connection box 100, the plurality of cavities 108a are disposed while being zoned in accordance with the leading-out direction of the electric wires 110 via the plurality of insertion ports 109.

Specifically, the electricity connection box 100 includes at least a first connection portion group 112A, a second connection portion group 112B, and a third connection portion group 112C, as the connection portion group 112. The first connection portion group 112A is configured to include the plurality of cavities 108a to which the terminal parts of the electric wires 110 that are provided inside the housing 101 and constitute the first electric wire group 111A are connected. The second connection portion group 112B is configured to include the plurality of cavities 108a to which the terminal parts of the electric wire 110 that are provided inside the housing 101 and constitute the second electric wire group 111B are connected. The third connection portion group 112C is configured to include the plurality of cavities 108a to which the terminal parts of the electric wire 110 that are provided inside the housing 101 and constitute the third electric wire group 111C are connected.

In addition, the first connection portion group 112A of the embodiment is positioned to be closer to the first insertion port 109A than the second connection portion group 112B and the third connection portion group 112C. The second connection portion group 112B is positioned to be closer to the second insertion port 109B than the first connection portion group 112A and the third connection portion group 112C. The third connection portion group 112C is positioned to be closer to the third insertion port 109C than the first connection portion group 112A and the second connection portion group 112B. Therefore, the first connection portion group 112A is disposed in the vicinity of the first insertion port 109A, the second connection portion group 112B is disposed in the vicinity of the second insertion port 109B, and the third connection portion group 112C is disposed in the vicinity of the third insertion port 109C.

More specifically, as illustrated in FIG. 5, the first connection portion group 112A is positioned to be closer to the first insertion port 109A than the second connection portion group 112B and the third connection portion group 112C in the plurality of blocks 108, here, in each of the first block 108A, the second block 108B, and the third block 108C. Similarly, the second connection portion group 112B is positioned to be closer to the second insertion port 109B than the first connection portion group 112A and the third connection portion group 112C in each of the first block 108A, the second block 108B, and the third block 108C. The third connection portion group 112C is positioned to be closer to the third insertion port 109C than the first connection portion group 112A and the second connection portion group 112B in each of the first block 108A, the second block 108B, and the third block 108C.

The above-described electricity connection box 100 includes: the housing 101 which accommodates the electronic components 102 therein, and includes the first insertion port 109A and the second insertion port 109B; the first connection portion group 112A made of the plurality of cavities 108a which are provided inside the housing 101 and to which the terminal parts of the plurality of electric wires 110 of the first electric wire group 111A are connected; and the second connection portion group 112B made of the plurality of cavities 108a which are provided inside the housing 101 and to which the terminal parts of the plurality of electric wires 110 of the second electric wire group 111B are connected, wherein the electric wires 110 of the first electric wire group 111A are inserted through the first insertion port 109A, the electric wires 110 of the second electric wire group 111B are inserted through the second insertion port 109B, the first connection portion group 112A is positioned to be closer to the first insertion port 109A than the second connection portion group 112B, and the second connection portion group 112B is positioned to be closer to the second insertion port 109B than the first connection portion group 112A.

Therefore, in the electricity connection box 100, the first connection portion group 112A and the second connection portion group 112B are disposed while being zoned in accordance with the leading-out direction of the electric wires 110 via the first insertion port 109A and the second insertion port 109B, the first connection portion group 112A is provided at a position near the first insertion port 109A, and the second connection portion group 112B is provided at a position near the second insertion port 109B. Accordingly, in the electricity connection box 100, the terminal parts of the electric wires 110 of the first electric wire group 111A which is led out of the first insertion port 109A are connected to the cavities 108a of the first connection portion group 112A in the vicinity of the first insertion port 109A, and the terminal parts of the electric wires 110 of the second electric wire group 111B which is led out of the second insertion port 109B are connected to the cavities 108a of the second connection portion group 112B in the vicinity of the second insertion port 109B. As a result, since it is possible to suppress an overlap of the electric wires 110 in the housing 101 and to prevent the height thereof from increasing, it is possible to achieve a low height and a small size of the housing 101 in the electricity connection box 100. In other words, in the electricity connection box 100, even when a low height and a small size of the housing 101 is achieved, for example, it is possible to prevent the lower cover 105 from being open.

Furthermore, the above-described electricity connection box 100 further includes the plurality of blocks 108 which are provided inside the housing 101, each of the blocks 108 is formed with a part of the cavities 108a of the first connection portion group 112A and a part of the cavities 108a of the second connection portion group 112B, while the first insertion port 109A and the second insertion port 109B are disposed at a certain interval with respect to the predetermined direction of the housing 101, the plurality of blocks 108 extend along the predetermined direction, and are adjacent to each other along the direction that intersects with the predetermined direction, the first connection portion group 112A is positioned to be closer to the first insertion port 109A than the second connection portion group 112B in each of the plurality of blocks 108, and the second connection portion group 112B is positioned to be closer to the second insertion port 109B than the first connection portion group 112A in each of the plurality of blocks 108. Therefore, in the electricity connection box 100, since each of the blocks 108 is formed along an aligning direction of the first insertion port 109A and the second insertion port 109B, and the blocks 108 are disposed to be adjacent to each other along a direction which intersects with the aligning direction, in each of the blocks 108, it is possible to provide the first connection portion group 112A at a position near the first insertion port 109A, and to provide the second connection portion group 112B at a position near the second insertion port 109B. As a result, in the electricity connection box 100, since the connection portion group 112 can be zoned in each of the blocks 108, and the electric wires 110 are unlikely to overlap with each other, for example, it is possible to achieve a low height and a small size of the housing 101 even when different power supply systems are configured in each block 108.

Furthermore, according to the electricity connection box 100 described above, the housing 101 includes the third insertion port 109C, wherein the third insertion port 109C is disposed at the certain interval with respect to the predetermined direction from the first insertion port 109A and the second insertion port 109B, the third connection portion group 112C is made of the cavities 108a which are provided inside the housing 101 and to which terminal parts of the electric wires 110 of the third electric wire group 111C are connected, the electric wires 110 of the third electric wire group 111C are inserted through the third insertion port 112C, and the third connection portion group 112C is positioned to be closer to the third insertion port 109C than the first connection portion group 112A and the second connection portion group 112B in each of the plurality of blocks 108. Therefore, in the electricity connection box 100, even when the third insertion port 109C is provided in addition to the first insertion port 109A and the second insertion port 109B, since it is possible to suppress the overlap of the electric wires 110 in the housing 101, and to prevent the height thereof from increasing, it is possible to achieve a low height of the housing 101 and to realize a small size thereof.

In addition, the above-described electricity connection box according to the present invention is not limited to the above-described embodiment, and can be changed in various manners within the range described in Claims of the invention.

In the description above, the housing 101 includes in total three parts which are the first insertion port 109A, the second insertion port 109B, and the third insertion port 109C, as the insertion port 109, but is not limited thereto, and may include at least two or more insertion ports 109. For example, the housing 101 may be configured not to include the third insertion port 109C, or may be configured to include four or more insertion ports 109.

In the description above, the electricity connection box 100 includes in total three parts which are the first block 108A, the second block 108B, and the third block 108C, as the block 108, but is not limited thereto. The electricity connection box 100 may be configured not to include the block 108, or may be configured to include two, or four or more blocks 108.

In the electricity connection box according to the present invention, the first connection portion group and the second connection portion group are disposed while being zoned in accordance with a leading-out direction of the electric wire via the first insertion port and the second insertion port, the first connection portion group which is positioned near the first insertion port is provided, and the second connection portion group is provided at a position near the second insertion port. Accordingly, in the electricity connection box, the terminal parts of the electric wires of the first electric wire group which is led out of the first insertion port are connected to the connection portions of the first connection portion group in the vicinity of the first insertion port, and the terminal parts of the electric wires of the second electric wire group which is lead out of the second insertion port are connected to the connection portions of the second connection portion group in the vicinity of the second insertion port. As a result, since the electricity connection box can suppress an overlap of the electric wires inside the housing and prevent the height thereof from increasing, an effect in which it is possible to achieve a low height and to realize a small size of the housing is achieved.

The present invention is based on Japanese Patent Application (No. JP-2014-117917) filed on Jun. 6, 2014, the entire subject matter of which is incorporated herein by way of reference.

What is claimed is:
1. An electricity connection box, comprising:
a housing which accommodates an electronic component therein, and includes a first insertion port and a second insertion port;
a first connection portion group made of a plurality of first connection portions which are provided inside the housing and to which terminal parts of a first plurality of electric wires of a first electric wire group are connected;
a second connection portion group made of a plurality of second connection portions which are provided inside the housing and to which terminal parts of a second plurality of the electric wires of a second electric wire group are connected; and
a plurality of blocks which are provided inside the housing, each of the blocks being formed with a part of the first connection portions of the first connection portion group and a part of the second connection portions of the second connection portion group, wherein the first plurality of the electric wires of the first electric wire group are inserted through the first insertion port, and the second plurality of the electric wires of the second electric wire group are inserted through the second insertion port, wherein the first connection portion group is positioned to be closer to the first insertion port than the second connection portion group, wherein the second connection portion group is positioned to be closer to the second insertion port than the first connection portion group, wherein the first insertion port and the second insertion port are disposed at a first certain interval with respect to a predetermined direction of the housing, and wherein the plurality of blocks extend along the predetermined direction, and are adjacent to each other along a direction that intersects with the predetermined direction.

2. The electricity connection box according to claim 1, wherein the first connection portion group is positioned to be closer to the first insertion port than the second connection portion group in each of the plurality of blocks, and wherein the second connection portion group is positioned to be closer to the second insertion port than the first connection portion group in each of the plurality of blocks.

3. The electricity connection box according to claim 2, wherein the housing includes a third insertion port and a third connection portion group, wherein the third insertion port is disposed at a second certain interval with respect to the predetermined direction from the first insertion port and the second insertion port, wherein the third connection portion group is made of a plurality of third connection portions which are provided inside the housing and to which terminal parts of a third plurality of electric wires of a third electric wire group are connected, wherein the third plurality of the electric wires of the third electric wire group are inserted through the third insertion port, and wherein the third connection portion group is positioned to be closer to the third insertion port than the first connection portion group and the second connection portion group in each of the plurality of blocks.

* * * * *